United States Patent
Kim et al.

(10) Patent No.: US 9,706,325 B2
(45) Date of Patent: *Jul. 11, 2017

(54) METHOD, MEDIUM, AND SYSTEM DECODING AND ENCODING A MULTI-CHANNEL SIGNAL

(71) Applicant: SAMSUNG ELECTRONICS CO., LTD., Suwon-si (KR)

(72) Inventors: Junghoe Kim, Seoul (KR); Eunmi Oh, Seongnam-si (KR); Kihyun Choo, Seoul (KR); Miao Lei, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,930

(22) Filed: Jun. 13, 2016

(65) Prior Publication Data

US 2016/0302021 A1    Oct. 13, 2016

Related U.S. Application Data

(63) Continuation of application No. 11/651,633, filed on Jan. 10, 2007, now Pat. No. 9,369,164.

(30) Foreign Application Priority Data

Jun. 30, 2006 (KR) .................. 10-2006-0049034

(51) Int. Cl.
H04R 5/00   (2006.01)
H04S 3/02   (2006.01)
(Continued)

(52) U.S. Cl.
CPC ............ *H04S 5/005* (2013.01); *G10L 19/008* (2013.01); *H04B 1/1646* (2013.01); *H04S 3/02* (2013.01); *H04S 3/00* (2013.01); *H04S 2420/01* (2013.01)

(58) Field of Classification Search
CPC ... H04S 3/00; H04S 3/02; H04S 5/005; H04S 2420/03; H04S 3/008; H04S 2420/01; H04S 2420/11
(Continued)

(56) References Cited

U.S. PATENT DOCUMENTS 5,524,054 A   6/1996 Spille
5,850,456 A   12/1998 Ten Kate et al.
(Continued)

FOREIGN PATENT DOCUMENTS

CN   1647158 A   7/2005
CN   1669359 A   9/2005
(Continued)

OTHER PUBLICATIONS

Communication dated Jan. 20, 2015 issued by the State Intellectual Property Office of People's Republic of China in counterpart Chinese Patent Application No. 201210459124.7.
(Continued)

*Primary Examiner* — Xu Mei
(74) *Attorney, Agent, or Firm* — Sughrue Mion, PLLC (57) ABSTRACT

A method, medium, and system decoding and/or encoding multiple channels. Accordingly, down-mixed multiple channels can be decoded/up-mixed to a left channel and a right channel during a first stage, thereby enabling a high quality sound output even in scalable channel decoding.

6 Claims, 6 Drawing Sheets

Related U.S. Application Data (60) Provisional application No. 60/782,616, filed on Mar. 16, 2006, provisional application No. 60/759,543, filed on Jan. 18, 2006, provisional application No. 60/758,985, filed on Jan. 17, 2006, provisional application No. 60/757,857, filed on Jan. 11, 2006.

(51) Int. Cl.
*H04S 5/00* (2006.01)
*G10L 19/008* (2013.01)
*H04B 1/16* (2006.01)
*H04S 3/00* (2006.01)

(58) Field of Classification Search
USPC ........... 381/10, 19, 20, 22–23, 27, 307–311; 700/94; 704/500–504, E19.005, E19.018
See application file for complete search history.

(56) References Cited

U.S. PATENT DOCUMENTS

| | | | |
|---|---|---|---|
| 7,356,152 | B2 | 4/2008 | Vernon et al. |
| 7,359,522 | B2 | 4/2008 | Aarts et al. |
| 7,391,870 | B2 | 6/2008 | Herre et al. |
| 7,394,903 | B2 | 7/2008 | Herre et al. |
| 7,447,317 | B2 | 11/2008 | Herre et al. |
| 7,447,629 | B2 | 11/2008 | Breebaart |
| 7,702,407 | B2 | 4/2010 | Oh et al. |
| 7,809,580 | B2 | 10/2010 | Hotho et al. |
| 7,860,720 | B2 | 12/2010 | Thumpudi et al. |
| 7,885,819 | B2 | 2/2011 | Koishida et al. |
| 7,970,144 | B1 | 6/2011 | Avendano et al. |
| 7,987,097 | B2 | 7/2011 | Pang et al. |
| 9,369,164 | B2 * | 6/2016 | Kim ..................... G10L 19/008 |
| 2002/0006081 | A1 | 1/2002 | Fujishita |
| 2002/0154900 | A1 | 10/2002 | Shimada |
| 2003/0219130 | A1 | 11/2003 | Baumgarte et al. |
| 2003/0236583 | A1 | 12/2003 | Baumgarte et al. |
| 2004/0117193 | A1 | 6/2004 | Kawai |
| 2005/0157883 | A1 | 7/2005 | Herre et al. |
| 2005/0195981 | A1 | 9/2005 | Faller et al. |
| 2005/0226426 | A1 | 10/2005 | Oomen et al. |
| 2005/0276420 | A1 | 12/2005 | Davis |
| 2005/0281408 | A1 | 12/2005 | Kim et al. |
| 2006/0165184 | A1 | 7/2006 | Purnhagen et al. |
| 2006/0206323 | A1 | 9/2006 | Breebaart |
| 2006/0239473 | A1 | 10/2006 | Kjorling et al. |
| 2007/0019813 | A1 | 1/2007 | Hilpert et al. |
| 2007/0043563 | A1 | 2/2007 | Comerford et al. |
| 2007/0078550 | A1 | 4/2007 | Pang et al. |
| 2007/0094036 | A1 | 4/2007 | Pang et al. |
| 2007/0189426 | A1 | 8/2007 | Kim et al. |
| 2007/0203697 | A1 | 8/2007 | Pang et al. |
| 2007/0233293 | A1 | 10/2007 | Villemoes et al. |
| 2007/0258607 | A1 | 11/2007 | Purnhagen et al. |
| 2007/0291951 | A1 | 12/2007 | Faller |
| 2008/0091436 | A1 | 4/2008 | Breebaart et al. |
| 2008/0161035 | A1 | 7/2008 | Tomioka et al. |
| 2008/0255856 | A1 | 10/2008 | Schuijers et al. |
| 2008/0263285 | A1 | 10/2008 | Sharma et al. |
| 2009/0232317 | A1 | 9/2009 | Emerit et al. |
| 2010/0087097 | A1 | 4/2010 | Hogue et al. |

FOREIGN PATENT DOCUMENTS

| | | |
|---|---|---|
| CN | 101647158 A | 2/2010 |
| JP | 07-234863 | 9/1995 |
| JP | 11-225390 | 8/1999 |
| JP | 2001-352599 | 12/2001 |
| JP | 2002-149483 | 5/2002 |
| JP | 2004-194100 | 7/2004 |
| JP | 2004-312484 A | 11/2004 |
| JP | 2044-312484 | 11/2004 |
| KR | 96-13080 | 4/1996 |
| KR | 1996-0039668 | 11/1996 |
| KR | 1997-7007528 | 12/1997 |
| KR | 5781882 | 7/1998 |
| KR | 2001-0086976 | 9/2001 |
| KR | 10-2002-0018730 | 3/2002 |
| KR | 10-2002-0082117 | 10/2002 |
| KR | 10-2005-0038096 | 4/2005 |
| KR | 10-2006-0047444 | 5/2006 |
| KR | 10-2006-0049941 | 5/2006 |
| KR | 10-2006-0109299 | 10/2006 |
| KR | 10-2007-005469 | 1/2007 |
| KR | 10-2007-0035411 | 3/2007 |
| KR | 10-2007-0078398 | 7/2007 |
| KR | 10-2007-0080850 | 8/2007 |
| KR | 10-0763919 | 9/2007 |
| WO | 03/028407 A2 | 4/2003 |
| WO | 2004/008805 | 1/2004 |
| WO | 2004008805 | 1/2004 |

OTHER PUBLICATIONS

Communication from the State Intellectual Property Office of P.R. China dated Apr. 23, 2015 in a counterpart Chinese application No. 201210458826.3.
US Office Action issued Jan. 7, 2014 in U.S. Appl. No. 12/071,286.
US Office Action issued Sep. 13, 2013 in U.S. Appl. No. 12/071,286.
US Office Action issued Jul. 17, 2012 in U.S. Appl. No. 12/071,286.
US Office Action issued Apr. 12, 2012 in U.S. Appl. No. 12/071,286.
US Office Action issued Jul. 26, 2011 in U.S. Appl. No. 12/071,286.
Japanese Office Action issued Jun. 11, 2013 in corresponding Japanese Patent Application No. 2012-253715.
Korean Office Action dated Jul. 30, 2013 in Korean Patent Application No. 10-2012-0108275.
Korean Office Action dated Jul. 30, 2013 in Korean Patent Application No. 10-2012-0064601.
Korean Office Action issued Oct. 24, 2013 in Korean Patent Application No. 10-2012-0108275.
Korean Office Action issued Oct. 24, 2013 in Korean Patent Application No. 10-2012-0064601.
Korean Notice of Allowance issued Aug. 29, 2007 in corresponding Korean Patent Application 10-2006-0075301.
Japanese Notice of Preliminary Reexamination dated Feb. 19, 2013 in corresponding Japanese Patent Application 2008-550238.
Korean Notice of Last Non-Final Rejection issued Feb. 27, 2013 in corresponding Korean Patent Application 10-2012-0064601.
Extended European Search Report issued Dec. 3, 2012 in European Patent Application No. 12164460.3.
Korean Office Action issued Dec. 18, 2012 in Korean Patent Application No. 10-2012-0108275.
Extended European Search Report for European Application No. 12002670.3 mailed Sep. 10, 2012.
Korean Office Action for related Korean Patent Application No. 10-2006-0049304 mailed Sep. 28, 2012.
Korean Office Action for related Korean Patent Application No. 10-2012-0083520 mailed Sep. 28, 2012.
Korean Office Action for related Korean Patent Application No. X10-2011-0056345 mailed Aug. 14, 2012.
Japanese Final Rejection mailed Jul. 17, 2012 in the corresponding Japanese Patent Applicationi No. 2008-550238.
Korean Office Action for related Korean Patent Application No. 10-2012-0064601 mailed Jun. 27, 2012.
Korean Office Action for related Korean Patent Application No. 10-2006-0049034 mailed Apr. 30, 2012.
Korean Non-Final Rejection mailed Jul. 18, 2011 corresponds to Korean Patent Application No. 10-2011-0056345.
Korean Notice of Allowance mailed Jul. 26, 2011 corresponds to Korean Patent Application No. 10-2007-0067134.
J. Herre et al., The Reference Model Architecture for Mpeg Spatial Audio Coding, Audio Engineering Society Convention Paper 6447, USA, Audio Engineering Society, May 28, 2005.

(56) References Cited

OTHER PUBLICATIONS

Japanese Office Action issued Jun. 7, 2011 corresponds to Japanese Patent Application No. 2008-550238.
Title: MPEG Spatial Audio Coding/MPEG sorround: Overview and Current Status Author: J Breebaart et al Journal: Audio Engineering Society Convention Paper 119th convention Oct. 7-10, 2005.
Breebart, J. et al. "MPEG Spatial Audoi Coding / Mpeg Surround: Overview and Current Status" In: Proc. 119th AES Convention. New York. Oct. 2005.
Herre, J. et al. "The Reference Model Architecture for MPEG Spatial Audio Coding" In: Proc. 118th AES Convention. Barcelona. May 2005.
ISO/IEC JTC 1/SC 29/WG 11 N7530 "Information technology—Coding of audio-visual objects—Part 3: Audio, Amendment 4: MPEG Surround" Oct. 2005.
PCT International Search Report issued Apr. 12, 2007 in corresponding International Application No. PCT/KR2007/000203.
Junghoe Kim et al., "Commends on signaling in MPEG Surround", Joint Video TEam (JVT) of ISO/IEC MPEG & ITU-T VCEG (ISO/IEC JTC 1/SC29/WG11, and ITU-T SG16 Q6), XX XX No. M12886, Jan. 12, 2006, XP0300415555.
Extended European Search Report issued Jan. 7, 2010 corresponds to European Patent Application 07708488.7-2225.
Notice of Allowance mailed in U.S. Appl. No. 11/651,633 mailed Feb. 12, 2016.
Final Office Action issued in U.S. Appl. No. 11/651,633 mailed Dec. 2, 2015.
Non-Final Office Action issued in U.S. Appl. No. 11/651,633 mailed Mar. 24, 2015.
Office Action issued in U.S. Appl. No. 11/651,633 mailed Aug. 18, 2010.
Office Action issued in U.S. Appl. No. 11/651,633 mailed Jul. 8, 2011.
Final Office Action issued in U.S. Appl. No. 11/651,633 mailed May 9, 2012.
Non-Final Office Action issued in U.S. Appl. No. 11/651,633 mailed Jan. 31, 2013.
Final Office Action issued in U.S. Appl. No. 11/651,633 mailed Jun. 10, 2013.
Communication dated Sep. 14, 2016 issued by the State Intellectual Property Office of P.R. China in counterpart Chinese Patent Application No. 201210457153.X.
Communication dated Nov. 10, 2016, issued by the European Patent Office in counterpart European Application No. 12164460.3.
Audio Subgroup, "Text of second working draft for Mpeg Surround", International Organization for Standardization, Organisation Internationale Normalisation, ISO/IEC JTC 1/SC 29/WG 11, Coding of Moving Pictures and Audio, No. N7387, Jul. 25, 2005, Poznan, Poland, ISO/IEC WD 23003-1, XP030013965, total 140 pages.

\* cited by examiner

METHOD, MEDIUM, AND SYSTEM DECODING AND ENCODING A MULTI-CHANNEL SIGNAL

CROSS-REFERENCE TO RELATED APPLICATIONS

This application is a continuation of U.S. application Ser. No. 11/651,633 filed Jan. 10, 2007, which claims the benefit of U.S. Provisional Patent Application No. 60/757,857, filed on Jan. 11, 2006, U.S. Provisional Patent Application No. 60/758,985, filed on Jan. 17, 2006, U.S. Provisional Patent Application No. 60/759,543, filed on Jan. 18, 2006, U.S. Provisional Patent Application No. 60/782,616, filed on Mar. 16, 2006, in the U.S. Patent and Trademark Office, and Korean Patent Application No. 10-2006-0049034, filed on May 30, 2006, in the Korean Intellectual Property Office, the disclosures of which are incorporated herein in their entirety by reference.

BACKGROUND OF THE INVENTION

1. Field of the Invention

One or more embodiments of the present invention relate to audio coding, and more particularly, to a surround audio coding method, medium, and system for encoding and/or decoding an audio signal.

2. Description of the Related Art

Generally, multi-channel audio coding includes waveform multi-channel audio coding and parametric multi-channel audio coding. The waveform multi-channel audio coding typically further includes moving picture experts group (MPEG)-2 MC audio coding, AAC audio coding, and BSAC/AVS MC audio coding, for example. In the waveform multi-channel audio coding, 5 channel signals may be encoded by an encoder terminal and 5 encoded channel signals may be received and ultimately decoded by a decoding terminal. The parametric multi-channel audio coding typically includes MPEG surround coding, where a multi-channel signal may be encoded and 1 or 2 encoded channel signals may be received and ultimately decoded to output 6 or 8 multi-channels, for example.

Figure 1A:
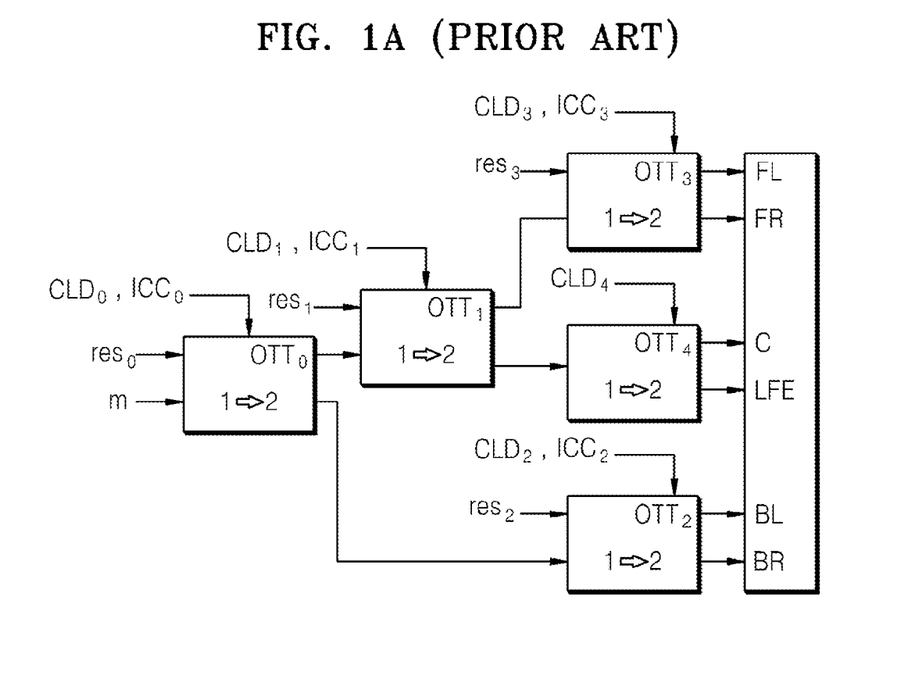
FIGS. 1A and 1B illustrate conventional first and second respective 5-1-5 tree structures for MPEG surround audio.
Figure 1B:
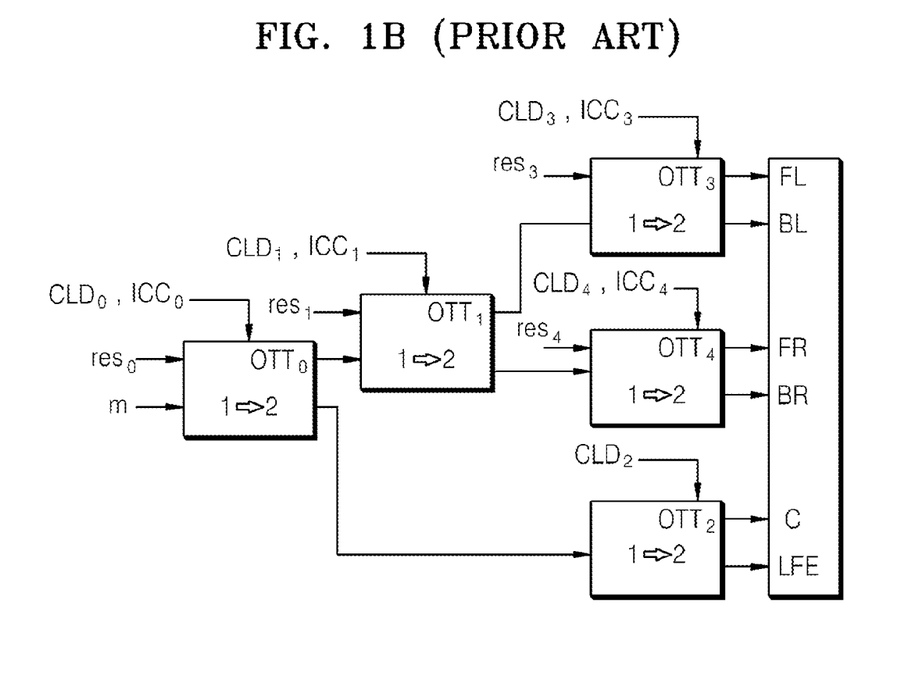

Here, such MPEG surround coding uses a first 5-1-5 tree structure, illustrated in FIG. 1A, or a second 5-1-5 tree structure, illustrated in FIG. 1B, in order to decode such a signal to multi-channels up-mix. The tree structures receive a down-mixed mono signal, i.e., a signal that has been encoded from multi-channel signals and output as a mono signal, and up-mixes the mono signal to multi-channel signals of a Front Left (FL) channel, a Front Right (FR) channel, a Center (C) channel, a Low Frequency Enhancement (LFE) channel, a Back Left (BL) channel, and a Back Right (BR) channel, using combinations of 1-to-2 (OTT) modules. Here, the up-mixing of the mono signal through the stages of OTT modules can be accomplished with previously generated spatial information of Channel Level Differences (CLDs) and/or Inter-Channel Correlations (ICCs), with the CLD being information about an energy ratio or difference between predetermined channels in multi-channels, and with the ICC being information about correlation or coherence corresponding to a time/frequency tile of input signals. With respective CLDs and ICCs, each staged OTT can up-mix a single input signal to respective output signals through each staged OTT.

Referring to FIG. 1A, in the first 5-1-5 tree structure, the first module $OTT_0$ outputs a signal including mixed information for FL, FR, C and LFE channels, and a signal including mixed information for BL and BR channels.

Similarly, referring to FIG. 1B, in the second 5-1-5 tree structure, the first module $OTT_0$ outputs a signal including mixed information for FL, BL, RF and BR channels, and a signal including mixed information for C and LFE channels. However, when selective decoding ("pruning"), e.g., if only selective channels are desired, the inventors have found it difficult to selective decode the different channels in either of the first or second 5-1-5 tree structures without performing all stages of OTT module decoding. For example, though an output of the $OTT_0$ modules of either first or second 5-1-5 tree structure could potentially be sampled, they are up-mixed signals representing information for a number of front channels and back channels mixed together and would not be properly representative of any one selective channel, such as if a stereo signal of left and right channels was desired.

Accordingly, embodiments of the present invention overcome the above drawbacks.

SUMMARY OF THE INVENTION

One or more embodiments of the present invention include a method, medium, and system encoding and/or decoding multiple channels such that a left channel and a right channel are capable of being selectively down-mixed at an earliest opportunity during a decoding up-mixing stage.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of decoding an input encoded multi-channel signal, including generating signals to be input to decorrelators using a down-mixed signal, as the encoded multi-channel signal, based on spatial cues, decorrelating the generated signals, as decorrelated signals, and mixing the down-mixed signal and the decorrelated signals using the spatial cues, wherein spatial cues first used to up-mix the down-mixed signal include respective information to decode a left channel and a right channel.

To achieve the above and/or other aspects and advantages, embodiments of the present invention include a method of decoding an input encoded multi-channel signal, consisting of defined channels, including generating signals to be input to decorrelators using a down-mixed signal, as the encoded multi-channel signal, based on spatial cues, decorrelating the generated signals, as decorrelated signals, and mixing the down-mixed signal and the decorrelated signals using the spatial cues, wherein spatial cues first used to up-mix the down-mixed signal include respective information to decode at least one of the defined channels.

To achieve the above and/or other aspects and advantages, embodiments of the present invention include a method of decoding an input encoded multi-channel signal, including generating signals to be input to decorrelators using a down-mixed signal, as the encoded multi-channel signal, based on spatial cues, decorrelating the generated signals, as decorrelated signals, and mixing the down-mixed signal and the decorrelated signals using the spatial cues, wherein spatial cues first used to up-mix the down-mixed signal include respective channel level differences (CLDs) or inter channel correlations (ICCs) between a left channel and a right channel to decode the left channel and the right channel.

To achieve the above and/or other aspects and advantages, embodiments of the present invention include a method of decoding an input encoded multi-channel signal, including generating signals to be input to decorrelators using a down-mixed signal, as the encoded multi-channel signal, based on spatial cues, decorrelating the generated signals, as decorrelated signals, and mixing the down-mixed signal and the decorrelated signals using the spatial cues, wherein, when the spatial cues are selectively used with a single up-mixing module, a corresponding up-mix of the down-mixed signal generates a left channel and a right channel from the up-mixing of the down-mixed signal.

To achieve the above and/or other aspects and advantages, embodiments of the present invention include a method of decoding an input encoded multi-channel signal, including generating signals to be input to decorrelators using a down-mixed signal, as the encoded multi-channel signal, based on spatial cues, decorrelating the generated signals as decorrelated signals, and mixing the down-mixed signal and the decorrelated signals using the spatial cues, wherein the decorrelated signals are selectively based only on spatial cues for up-mixing the down-mixed signal to a left channel and a right channel.

To achieve the above and/or other aspects and advantages, embodiments of the present invention include at least one medium including computer readable code to control at least one processing element to implement an embodiment of the present invention.

To achieve the above and/or other aspects and advantages, embodiments of the present invention include a system decoding an input encoded multi-channel signal, including a pre-matrix application unit to generate signals to be input to decorrelators using a down-mixed signal, as the encoded multi-channel signal, based on spatial cues, a decorrelation unit to decorrelate the generated signals through respective decorrelators, as decorrelated signals, and a post-matrix unit to mix the down-mixed signal and the decorrelated signals using the spatial cues, wherein spatial cues first used to up-mix the down-mixed signal include respective information to decode a left channel and a right channel.

To achieve the above and/or other aspects and advantages, embodiments of the present invention include a system of decoding an input encoded multi-channel signal, consisting of defined channels, including a pre-matrix application unit to generate signals to be input to decorrelators using a down-mixed signal, as the encoded multi-channel signal, based on spatial cues, a decorrelation unit to decorrelate the generated signals through respective decorrelators, as decorrelated signals, and a post-matrix unit to mix the down-mixed signal and the decorrelated signals using the spatial cues, wherein spatial cues first used to up-mix the down-mixed signal include respective information to decode at least one of the defined channels.

To achieve the above and/or other aspects and advantages, embodiments of the present invention include a system of decoding an input encoded multi-channel signal, including a pre-matrix application unit to generate signals to be input to decorrelators using a down-mixed signal, as the encoded multi-channel signal, based on spatial cues, a decorrelation unit to decorrelate the generated signals through respective decorrelators, as decorrelated signals, and a post-matrix unit to mix the down-mixed signal and the decorrelated signals using the spatial cues, wherein spatial cues first used to up-mix the down-mixed signal include respective channel level differences (CLDs) or inter channel correlations (ICCs) between a left channel and a right channel to decode the left channel and the right channel.

To achieve the above and/or other aspects and advantages, embodiments of the present invention include a system of decoding an input encoded multi-channel signal, including a pre-matrix application unit to generate signals to be input to decorrelators using a down-mixed signal, as the encoded multi-channel signal, based on spatial cues, a decorrelation unit to decorrelate the generated signals through respective decorrelators, as decorrelated signals, and a post-matrix unit to mix the down-mixed signal and the decorrelated signals using the spatial cues, wherein, when the spatial cues are selectively used with a single up-mixing module, a corresponding up-mix of the down-mixed signal generates a left channel and a right channel from the up-mixing of the down-mixed signal.

To achieve the above and/or other aspects and advantages, embodiments of the present invention include a system of decoding an input encoded multi-channel signal, including a pre-matrix application unit to generate signals to be input to decorrelators using a down-mixed signal, as the encoded multi-channel signal, based on spatial cues, a decorrelation unit to decorrelate the generated signals through respective decorrelators, and a post-matrix unit to mix the down-mixed signal and the decorrelated signals using the spatial cues, wherein the decorrelated signals are selectively based only on spatial cues for up-mixing the down-mixed signal to a left channel and a right channel.

To achieve the above and/or other aspects and advantages, embodiments of the present invention include a method of encoding multi-channels to a down-mixed signal, including down-mixing multi-channel signals to a left channel and a right channel lastly, as the down-mixed signal, extracting spatial cues of the down-mixed signal, including spatial cues generated during down-mixing of channels of the multi-channels for the channels in addition to the left channel and the right channel, and generating a bitstream including the down-mixed signal and the extracted spatial cues.

To achieve the above and/or other aspects and advantages, embodiments of the present invention include a system for encoding multi-channels to a down-mixed signal, including a down-mixing unit to down-mix multi-channel signals to a left channel and a right channel lastly, as the down-mixed signal, an information extracting unit to extract spatial cues of the down-mixed signal, including spatial cues generated during down-mixing of channels of the multi-channels for the channels in addition to the left channel and the right channel, and a bitstream generation unit to generate a bitstream including the down-mixed signal and the extracted spatial cues.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
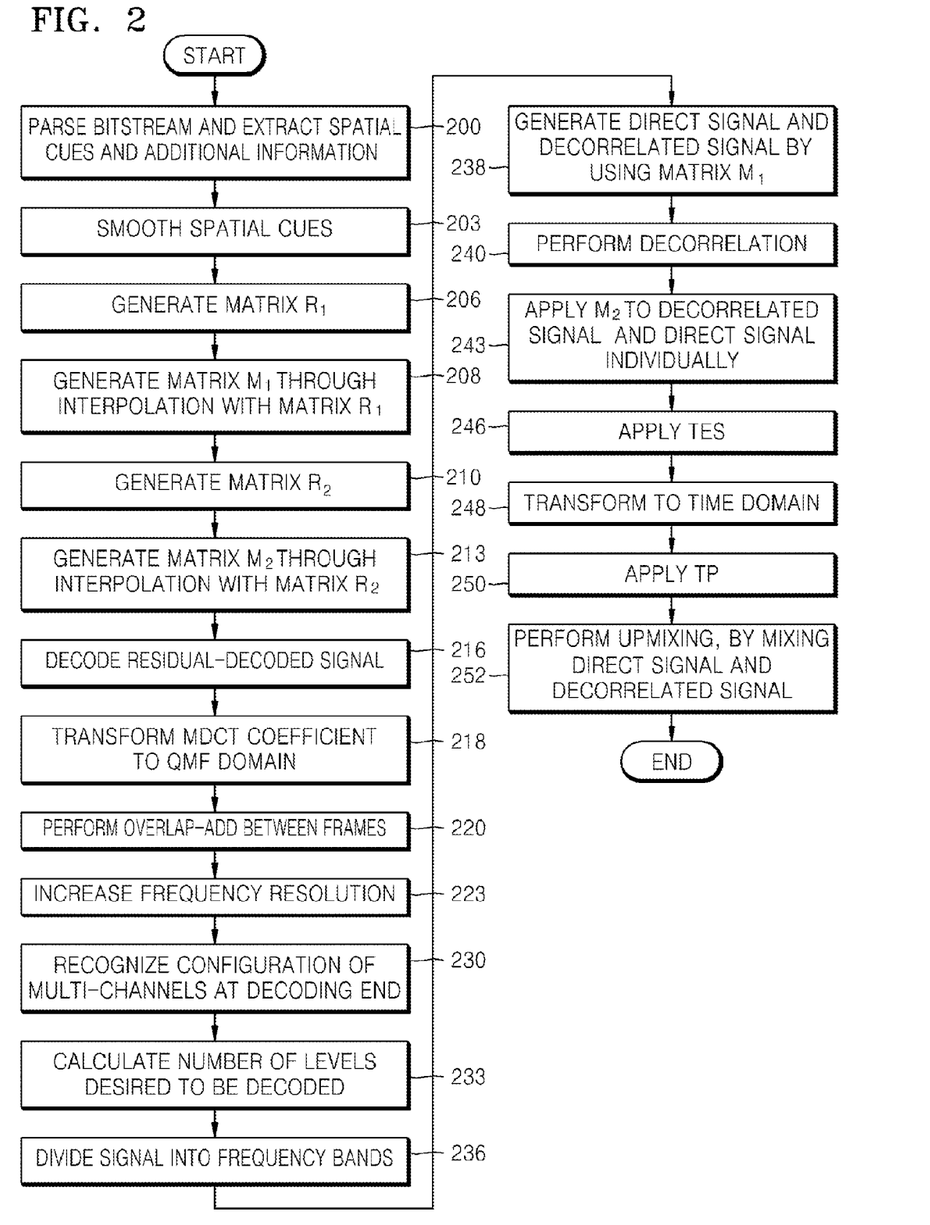
FIG. 2 illustrates a method of decoding multiple channels, according to an embodiment of the present invention.

FIG. 2 illustrates a method of decoding multiple channels, according to an embodiment of the present invention. Below, initially a decoding operation will be discussed for a first level/stage OTT0 (1-to-2) module and a $TTT_0$ (2-to-3) module, such as shown as in FIG. 4, to first up-mix an input down-mixed signal to left (L) and right (R) channel signals and then to L, R, and center (C) channel signals, respectively. With such a decoding operation, selective up-mixing/decoding of an input down-mixed signal is now possible.

Thus, initially, by parsing a surround bitstream, e.g., as transmitted by an encoding terminal, spatial cues and additional information may be extracted, in operation 200.

By using the extracted spatial cues, spatial cues may be selectively smoothed in order to prevent sudden changes of the spatial cues at a low bitrate, in operation 203.

In order to maintain compatibility with a conventional matrix surround techniques, a gain and a pre-vector may be calculated with respect to each additional channel and if an external down-mix is used in a corresponding decoding terminal, a variable for compensating for a gain in each channel may be extracted, thereby generating a matrix R1, in operation 206. The matrix R1 is a matrix used to generate a signal to be input to decorrelators, e.g., disposed in a decorrelation unit 340 shown in FIG. 3. When the matrix R1 is generated in operation 206, spatial cues are used. Here, the spatial cues being used include, for example, information on the difference or correlation between a left (L) channel and a right (R) channel, such as respective channel level difference (CLD) or inter channel correlation (ICC) between the L channel and the R channel. For example, the spatial cues may include a respective spatial cue to be used by the first $OTT_0$ module 400, for example, as illustrated in FIG. 4, which decodes and up-mixes an input down-mixed signal, such as a down-mixed signal generated by an encoding terminal, directly into L and R channels. When only the L channel and the R channel are being decoded the spatial cues may only include the respective CLD or ICC between the L channel and the R channel.

In an embodiment, R1 may be generated differently in operation 206 depending on the mode of the $TTT_0$ module illustrated in FIG. 4. For example, in the MPEG surround coding, the variable bsTttModeLow, having relations illustrated in Table 1 below, is used as a variable indicating the mode of the $TTT_0$ module:

TABLE 1

| bsTttModeLow | Meaning |
|---|---|
| 0 | prediction mode (2 CPC, ICC) with decorrelation |
| 1 | prediction mode (2 CPC, ICC) without decorrelation |

TABLE 1-continued

| bsTttModeLow | Meaning |
|---|---|
| 2 | energy-based mode (2 CLD) with subtraction, matrix compatibility enabled |
| 3 | energy-based mode (2 CLD) with subtraction, matrix compatibility disabled |
| 4 | energy-based mode (2 CLD) without subtraction, matrix compatibility enabled |
| 5 | energy-based mode (2 CLD) without subtraction, matrix compatibility disabled |
| 6 | reserved |
| 7 | reserved |

Here, in such an embodiment, if bsTttModeLow(0) is less than 2, a matrix R1 according to the below Equation 1 may be generated.

Equation 1

$$R_1^{l,m} = \begin{bmatrix} 1 & 0 \\ 1 & 0 \\ \gamma^{l,m}\frac{1}{3}((\alpha^{l,m}+2)c_{1,OTT_0}^{l,m}+(\beta^{l,m}-1)c_{2,OTT_0}^{l,m}) & 1 \\ \gamma^{l,m}\frac{1}{3}((\alpha^{l,m}-1)c_{1,OTT_0}^{l,m}+(\beta^{l,m}+2)c_{2,OTT_0}^{l,m}) & 1 \\ \gamma^{l,m}\frac{1}{3}((1-\alpha^{l,m})\sqrt{2}\,c_{1,OTT_0}^{l,m}+(1-\beta^{l,m})\sqrt{2}\,c_{2,OTT_0}^{l,m}) & -\sqrt{2} \end{bmatrix},$$

$$0 \le m < m_{tttLowProc}(0), \ 0 \le l < L$$

where $\alpha^{l,m}$, $\beta^{l,m}$ and $\gamma^{l,m}$ are given by:

$$\gamma^{l,m} = \begin{cases} 1 & m > m_{resProc}(4),\ bsResidualPresent(4)=1, \\ D_{ICC}(4,l,m) & bsResidualCoding=1 \\ 1 & \text{otherwise} \end{cases}$$

$\alpha^{l,m} = D_{CPC\_1}(0, l, m), 0 \le m < m_{tttLowProc}(0), 0 \le l < L$ $\beta^{l,m} = D_{CPC\_2}(0, l, m), 0 \le m < m_{tttLowProc}(0), 0 \le l < L$ If bsTttModeLow(0) is 3, a matrix R1 according the below Equation 2 may be generated.

Equation 2

$$R_1^{l,m} = \begin{bmatrix} 1 & 0 \\ OTT_0 \ 1 & 0 \\ \frac{1}{3}(w_{11}^{l,m}c_{1,OTT_0}^{l,m}+w_{12}^{l,m}c_{2,OTT_0}^{l,m}) & 1 \\ \frac{1}{3}(w_{21}^{l,m}c_{1,OTT_0}^{l,m}+w_{22}^{l,m}c_{2,OTT_0}^{l,m}) & 1 \\ \frac{1}{3}(w_{31}^{l,m}\sqrt{2}\,c_{1,OTT_0}^{l,m}+w_{32}^{l,m}\sqrt{2}\,c_{1,OTT_0}^{l,m}) & -\sqrt{2} \end{bmatrix},$$

$$0 \le m < m_{tttLowProc}(0), \ 0 \le l < L$$

where $$w_{11}^{l,m} = \sqrt{\frac{q_1^{l,m}q_2^{l,m}+q_2^{l,m}(1+q_2^{l,m})}{q_1^{l,m}q_2^{l,m}+(1+q_2^{l,m})^2}}$$

$$w_{12}^{l,m} = \sqrt{\frac{q_2^{l,m}(1+q_2^{l,m})^2}{(q_1^{l,m}+q_2^{l,m}+1)(q_1^{l,m}q_2^{l,m}+(1+q_2^{l,m})^2)}}$$

$$w_{21}^{l,m} = \sqrt{\frac{(1+q_2^{l,m})^2}{(q_1^{l,m}q_2^{l,m}+q_2^{l,m}+1)(q_1^{l,m}q_2^{l,m}+(1+q_2^{l,m})^2)}}$$

$$w_{22}^{l,m} = \sqrt{\frac{q_1^{l,m}q_2^{l,m}+q_2^{l,m}+1}{q_1^{l,m}q_2^{l,m}+(1+q_2^{l,m})^2}}$$

$$w_{31}^{l,m}(q_1^{l,m}q_2^{l,m}+(1+q_2^{l,m})^2)^{-1/2}$$
$$w_{32}^{l,m} = q_2^{l,m}(q_1^{l,m}q_2^{l,m}+(1+q_2^{l,m})^2)^{-1/2}$$

If bsTttModeLow(0) is 5, a matrix R1 according to the below Equation 3 may be generated.

Equation 3

$$R_1^{l,m} = \begin{bmatrix} 1 & 0 \\ 1 & 0 \\ \frac{1}{3}w_{11}^{l,m}c_{1,OTT_0}^{l,m} & 1 \\ \frac{1}{3}w_{22}^{l,m}c_{2,OTT_0}^{l,m} & 1 \\ \frac{1}{3}(w_{31}^{l,m}\sqrt{2}\,c_{1,OTT_0}^{l,m} + w_{32}^{l,m}\sqrt{2}\,c_{2,OTT_0}^{l,m}) & -\sqrt{2} \end{bmatrix},$$

$0 \le m < m_{tttLowProc}(0),\ 0 \le l < L$ where $$w_{11}^{l,m} = \sqrt{\frac{q_1^{l,m}q_2^{l,m}}{q_2^{l,m}+1+q_1^{l,m}q_2^{l,m}}} \quad w_{22}^{l,m} = \sqrt{\frac{q_1^{l,m}}{q_1^{l,m}+q_2^{l,m}+1}}$$

$$w_{31}^{l,m} = \frac{1}{2}\sqrt{\frac{q_2^{l,m}+1}{q_2^{l,m}+1+q_1^{l,m}q_2^{l,m}}} \quad w_{32}^{l,m} = \frac{1}{2}\sqrt{\frac{q_2^{l,m}+1}{q_1^{l,m}+q_2^{l,m}+1}}$$

By performing interpolation with the matrix R1, e.g., as generated in operation 206, a matrix M1 may be generated, in operation 208.

A matrix R2 to be used in mixing decorrelated signals and a direct signal may further be generated using the below Equation 4, in operation 210. When the matrix R2 is generated in operation 210, spatial cues are used. Here, the spatial cues being used include respective information on the difference or correlation between an L channel and an R channel, for example, such as a respective CLD or ICC between the L channel and the R channel, and such spatial cues may solely be used if only decoding of the L channel and the R channel is to be performed. For example, the spatial cues may include a spatial cue used in the first $OTT_0$ module 400, illustrated in FIG. 4, which decodes and up-mixes the aforementioned input down-mixed signal, to an L channel and an R channel.

Equation 4

$$R_2^{l,m} = \begin{bmatrix} \kappa_{TTT_0}^{l,m} H11_{OTT_3}^{l,m} \frac{1}{3}\gamma^{l,m}((\alpha^{l,m}+2)H11_{OTT_0}^{l,m}+(\beta^{l,m}-1)H21_{OTT_0}^{l,m}) & H12_{OTT_3}^{l,m} & 0 & 0 \\ \kappa_{TTT_0}^{l,m} H11_{OTT_3}^{l,m} \frac{1}{3}\gamma^{l,m}((\alpha^{l,m}+2)H12_{OTT_0}^{l,m}+(\beta^{l,m}-1)H22_{OTT_0}^{l,m}) & & & \\ H21_{OTT_3}^{l,m} \frac{1}{3}\gamma^{l,m}((\alpha^{l,m}+2)H11_{OTT_0}^{l,m}+(\beta^{l,m}-1)H21_{OTT_0}^{l,m}) & H22_{OTT_3}^{l,m} & 0 & 0 \\ H21_{OTT_3}^{l,m} \frac{1}{3}\gamma^{l,m}((\alpha^{l,m}+2)H12_{OTT_0}^{l,m}+(\beta^{l,m}-1)H22_{OTT_0}^{l,m}) & & & \\ \kappa_{TTT_0}^{l,m} H11_{OTT_2}^{l,m} \frac{1}{3}\gamma^{l,m}((\alpha^{l,m}-1)H11_{OTT_0}^{l,m}+(\beta^{l,m}+2)H21_{OTT_0}^{l,m}) & 0 & H12_{OTT_2}^{l,m} & 0 \\ \kappa_{TTT_0}^{l,m} H11_{OTT_2}^{l,m} \frac{1}{3}\gamma^{l,m}((\alpha^{l,m}-1)H12_{OTT_0}^{l,m}+(\beta^{l,m}+2)H22_{OTT_0}^{l,m}) & & & \\ H21_{OTT_2}^{l,m} \frac{1}{3}\gamma^{l,m}((\alpha^{l,m}-1)H11_{OTT_0}^{l,m}+(\beta^{l,m}+2)H21_{OTT_0}^{l,m}) & 0 & H22_{OTT_2}^{l,m} & 0 \\ H21_{OTT_2}^{l,m} \frac{1}{3}\gamma^{l,m}((\alpha^{l,m}-1)H12_{OTT_0}^{l,m}+(\beta^{l,m}+2)H22_{OTT_0}^{l,m}) & & & \\ \kappa_{TTT_0}^{l,m} c_{1,OTT_1}^{l,m} \frac{\sqrt{2}}{3}\gamma^{l,m}((1-\alpha^{l,m})H11_{OTT_0}^{l,m}+(1-\beta^{l,m})H21_{OTT_0}^{l,m}) & 0 & 0 & 0 \\ \kappa_{TTT_0}^{l,m} c_{1,OTT_1}^{l,m} \frac{\sqrt{2}}{3}\gamma^{l,m}((1-\alpha^{l,m})H12_{OTT_0}^{l,m}+(1-\beta^{l,m})H22_{OTT_0}^{l,m}) & & & \\ c_{2,OTT_1}^{l,m} \frac{\sqrt{2}}{3}\gamma^{l,m}((1-\alpha^{l,m})H11_{OTT_0}^{l,m}+(1-\beta^{l,m})H21_{OTT_0}^{l,m}) & 0 & 0 & 0 \\ c_{2,OTT_1}^{l,m} \frac{\sqrt{2}}{3}\gamma^{l,m}((1-\alpha^{l,m})H12_{OTT_0}^{l,m}+(1-\beta^{l,m})H22_{OTT_0}^{l,m}) & & & \end{bmatrix}$$

where, the elements are defined using the definition of arbitrary matrix elements $H11_{OTT_x}^{l,m} \ldots H22_{OTT_x}^{l,m}$ as outlined in section, for which, $CLD_X^{l,m} = D_{CLD}(X,l,m), 0 \leq X \leq 3, 0 \leq m < M_{proc}, 0 \leq l \leq L$ $ICC_X^{l,m} = D_{ICC}(X,l,m), 0 \leq X \leq 3, 0 \leq m < M_{proc}, 0 \leq l \leq L$ By performing interpolation with the generated matrix R2, a matrix M2 may be generated, in operation 213.

A signal obtained by ACC-encoding and then, residual-coding of the difference between a signal down-mixed from multi-channels and an original signal at an encoding terminal may be decoded, in operation 216.

Thereafter a modified discrete cosine transform (MDCT) coefficient, e.g., decoded in operation 216, may be transformed to a quadrature mirror filter (QMF) domain, in operation 218.

Overlap-add between frames may then be performed with respect to the signal output in operation 218, in operation 220.

Since a low frequency band signal has insufficient frequency resolution because of a QMF filterbank, the frequency resolution may be increased through additional filtering, in operation 223.

Thereafter, in one embodiment, a configuration of available channels or speakers in the decoding terminal may be recognized, in operation 230. Here, the configuration of the channels or speakers indicates the number of speakers disposed or available at the decoding end, the positions of operable speakers among the speakers disposed at the decoding end, and information on channels that can be used in the multi-channels arranged at the decoding end among the channels encoded in the encoding terminal, for example, noting that additional embodiments are equally available for determining how selective to make the decoding of the input down-mixed signal.

By using the recognized configuration, for example, the number of up-mixing stages/levels can calculated in operation 233.

By using a QMF hybrid analysis filterbank, the input signal may be divided into frequency bands, in operation 236.

By using the matrix M1, a direct signal and signals to be input to decorrelators may further be generated, in operation 238. Here, a signal to be input to a decorrelator $D_0^{OTT}$, decorrelating an L channel and an R channel, corresponding to the first $OTT_0$ module, a signal to be input to a decorrelator $D_0^{TTT}$ decorrelating an L channel, an R channel and a center (C) channel, corresponding to the $TTT_0$, module, a signal to be input to a decorrelator $D_3^{OTT}$ decorrelating a front left (FL) channel and a back left (BL) channel, corresponding to an $OTT_3$ module, and a signal to be input to a decorrelator $D_2^{OTT}$ decorrelating a front right (FR) channel and a back right (BR) channel, corresponding to an $OTT_2$ module, are generated. Also, in operation 238, the number of levels to be decoded is adjusted according to the number of levels calculated in operation 233, so that decoding can be performed through the aforementioned scalable up-mixing.

With the signals generated in operation 238 to be input to decorrelators, decorrelation is performed in decorrelators and the signals are rearranged such that the signals can provide a spatial effect.

Again, the decorrelator $D_0^{OTT}$ decorrelates an L channel and an R channel, corresponding to the first $OTT_0$ module, the decorrelator $D_0^{TTT}$ decorrelates an L channel, an R channel, and a C channel, corresponding to the $TTT_0$ module, the decorrelator $D_2^{OTT}$ decorrelates an FR channel and a BR channel corresponding to the $OTT_2$ module, and the decorrelator $D_3^{OTT}$ decorrelates an FL channel and a BL channel corresponding to the $OTT_3$ module.

The matrix M2 generated in operation 213 may thus be applied to the signals decorrelated in operation 240 and the corresponding direct signal generated in operation 238 individually, in operation 243.

Here, in operation 243, the number of levels to be decoded may be adjusted, for example, according to the number of levels calculated in operation 233, so that decoding can be performed through the aforementioned scalable up-mixing.

Temporal envelope shaping (TES) may also be applied to the signal to which the matrix M2 is applied in operation 243, in operation 246.

The signal to which the TES is applied in operation 246 may further be transformed to the time domain by using a QMF hybrid synthesis filterbank, in operation 248.

Temporal processing (TP) may then be applied to the signal transformed in operation 248, in operation 250.

Here, operations 243 and 250 can be performed in order to improve the sound quality of a signal in which a temporal structure is important as in an applause signal, though operations 243 and 250 can be selectively applied and are not necessarily required.

The direct signal and the decorrelated signals can then be mixed in operation 253.

Though this embodiment was explained through the illustrated example of a 5.1-channel signal, embodiments of the present invention are not limited thereto. The method of decoding multi-channels, according to embodiments of the present invention, can be equally applied to all multi-channels in which an input down-mixed signal is first up-mixed to an L channel and an R channel during the decoding of the down-mixed signal.

Figure 3:
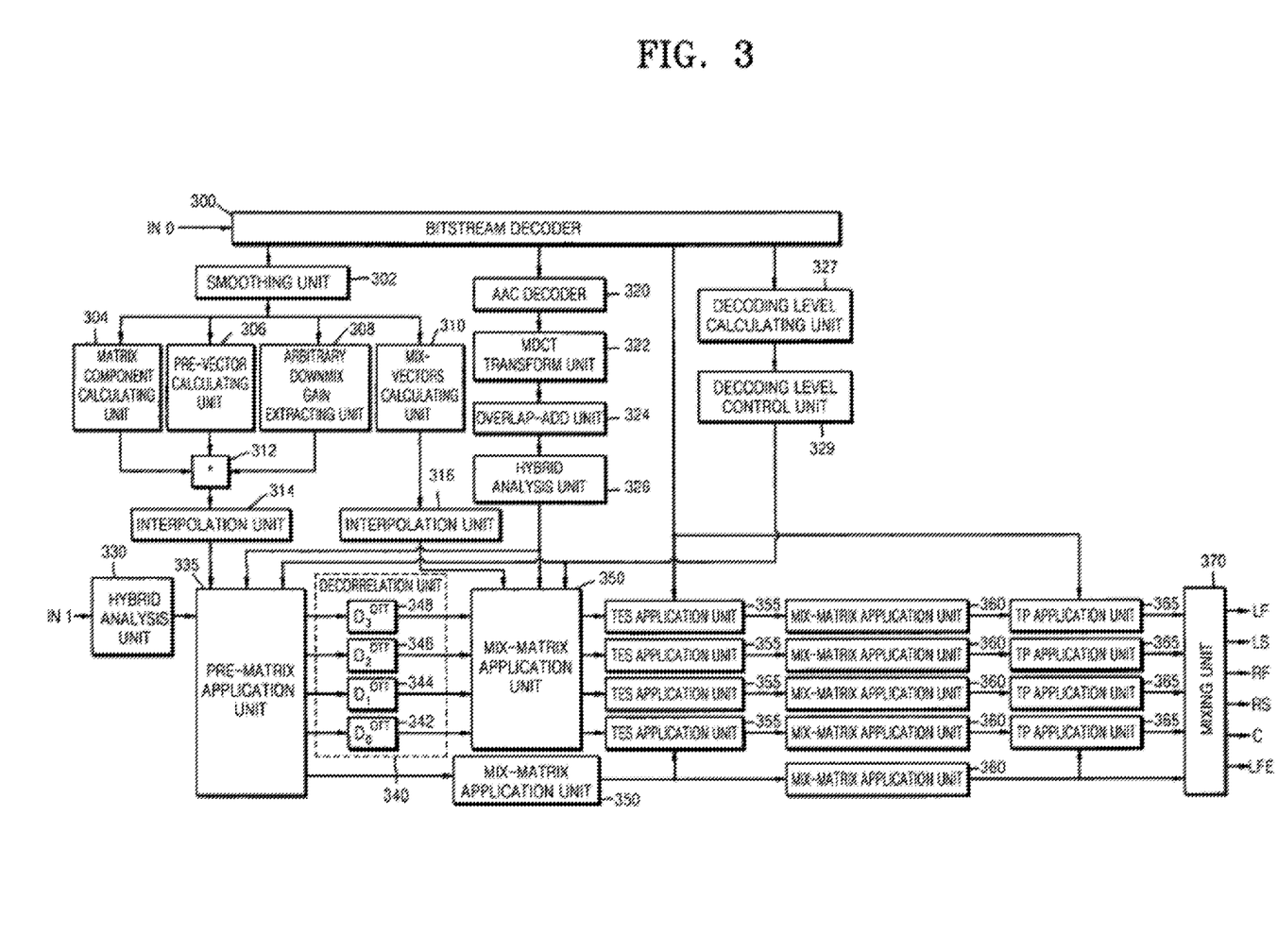
FIG. 3 illustrates a system for decoding multiple channels, according to an embodiment of the present invention.
Figure 4:
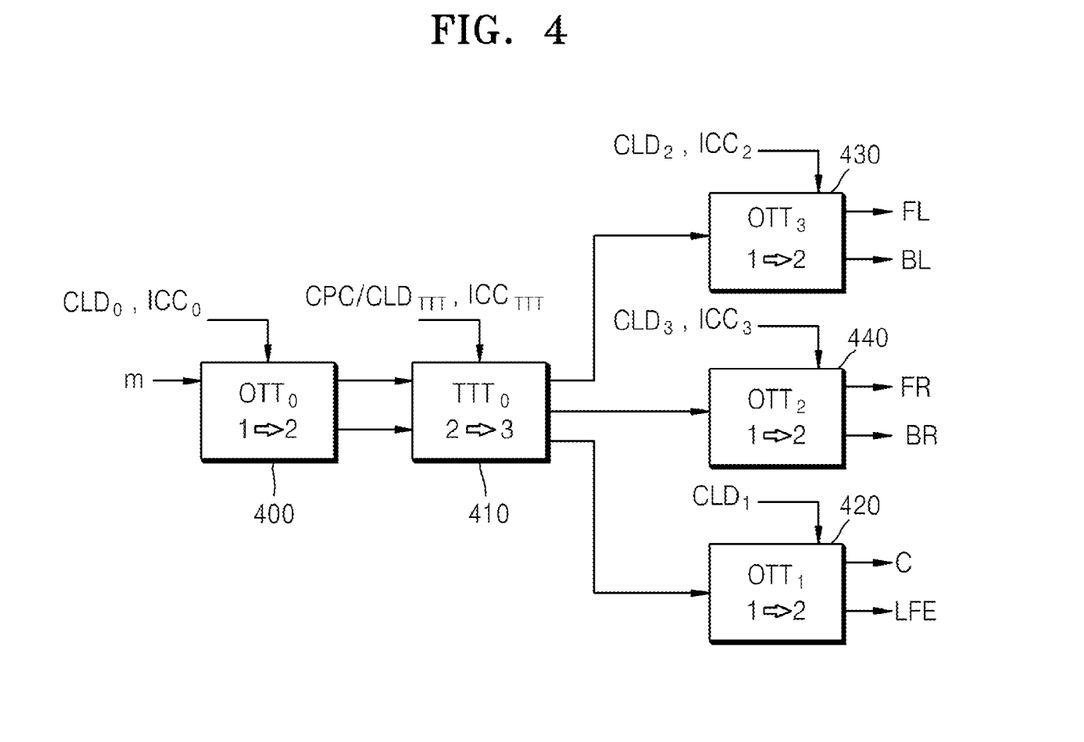
FIG. 4 illustrating a 5-1-5 tree structure, according to an embodiment of the present invention.

Accordingly, FIG. 3 illustrates a system for decoding multiple channels, according to an embodiment of the present invention.

A bitstream decoder 300 may parse a surround bitstream and extract spatial cues and additional information.

A smoothing unit 302 may smooth the spatial cues in order to prevent sudden changes of the spatial cues at a low bitrate.

In an embodiment, in order to maintain compatibility with a conventional matrix surround method, a matrix component calculating unit 304 may calculate a gain with respect to each additional channel.

A pre-vectors calculating unit 308 calculates a pre-vector.

If external down-mix is used in a decoder, an arbitrary down-mix gain extracting unit 308 may extract a variable for compensating for a gain in each channel.

Accordingly, by using the outputs from the matrix component calculating unit 304, the pre-vectors calculating unit 308, and the arbitrary down-mix gain extracting unit 308, the matrix generation unit 312 generates a matrix R1. When the matrix R1 is generated in the matrix generation unit 312, spatial cues are used. Here, the spatial cues being used include information on the difference or correlation between an L channel and an R channel, such as the aforementioned respective CLD or ICC between the L channel and the R channel. For example, the spatial cues may include a spatial cue used in the first $OTT_0$ module 400, illustrated in FIG. 4, which decodes and up-mixes an input down-mixed signal to an L channel and an R channel.

Here, the matrix generation unit 312 generates R1 differently depending on the mode of the $TTT_0$ module illustrated in FIG. 4. For example, in the MPEG surround coding, bsTttModeLow having relations illustrated the above Table 1 can be used as a variable indicating the mode of the $TTT_0$ module.

Here, similar to above, if bsTttModeLow(0) is less than 2, the aforementioned matrix R1 in the above Equation 1 may be generated.

If bsTttModeLow(0) is 3, the aforementioned matrix R1 in the above Equation 2 may be generated.

If bsTttModeLow(0) is 5, the aforementioned matrix R1 in the above Equation 3 may be generated.

Thus, by performing interpolation with the matrix R1 generated in the matrix generation unit 312, an interpolation unit 314 may generate a matrix M1.

A mix-vectors calculating unit 310 may then generate a matrix R2 for mixing the signals decorrelated in the decorrelation unit 340 and the direct signal. When the matrix R2 is generated in the mix-vectors calculating unit, spatial cues are used. Here, the spatial cues being used include the information on the difference or correlation between an L channel and an R channel, such as the aforementioned CLD or ICC between the L channel and the R channel. For example, the spatial cues may include a spatial cue used in the $OTT_0$ module 400, illustrated in FIG. 4, which decodes and up-mixes the input down-mixed signal to an L channel and an R channel.

The mix-vectors calculating unit 310 may, thus, generate a matrix R2 according to the above Equation 4.

Thus, by performing interpolation with the matrix R2 generated in the mix-vectors calculating unit 310, the interpolation unit 316 may generate the matrix M2.

An AAC decoder 320 may then decode a signal generated by ACC-encoding and then, residual-coding the difference between the input down-mixed signal and the original signal at the encoding terminal.

An MDCT transform unit (MDCT2QMF unit) 322 may then transform the MDCT coefficient output from the AAC decoder 320 to the QMF domain, and up-mixes the QMF domain signal, substituting for the decorrelation unit 340.

An overlap-add unit 324 performs overlap-add between frames with respect to the signal output from the MDCT transform unit 322.

Since a low frequency band signal has insufficient frequency resolution because of a QMF filterbank, a hybrid analysis unit 326 may be used to increase the frequency resolution through additional filtering.

Depending on the embodiment, a decoding level calculating unit 327 may then be used to recognize a configuration of channels or speakers, for example, in the decoding terminal and calculate the number of stages/levels of up-mixing/decoding.

Here, as only an example, such a configuration of multi-channels at the decoding end indicates the number of speakers disposed at the decoding end, the positions of operable speakers among the speakers disposed at the decoding end, and information on channels that can be used in the multi-channels arranged at the decoding end among the channels encoded in the encoding end.

A decoding level control unit 329 may then output a control signal so that decoding can be performed according to the number of levels calculated in the decoding level calculating unit 327.

A hybrid analysis unit 330 may be a QMF hybrid analysis filterbank and divide an input signal into frequency bands.

A pre-matrix application unit 335 may further generate a direct signal and signals to be input to decorrelators, by using the matrix M1.

Here, in this embodiment, the pre-matrix application unit 335 generates a signal to be input to a decorrelator $D_0^{OTT}$ 342 decorrelating an L channel and an R channel, corresponding to the first $OTT_0$ module, a signal to be input to a decorrelator $D_0^{TTT}$ 344 decorrelating an L channel, an R channel and a C channel, corresponding to the $TTT_0$ module, a signal to be input to a decorrelator $D_2^{OTT}$ 346 decorrelating an FR channel and a BR channel, corresponding to the $OTT_2$ module, and a signal to be input to a decorrelator $D_3^{OTT}$ 348 decorrelating an FL channel and a BL channel, corresponding to the $OTT_3$ module. Also, the pre-matrix application unit 335 may adjust the number of levels to be decoded in response to the control signal output from the decoding level control unit 329, for example, so that decoding can be performed through the aforementioned scalable up-mixing.

The decorrelation unit 340 may perform decorrelation with the signals generated in the pre-matrix application unit 335, thereby rearranging the signals such that the signals can provide a spatial effect. The decorrelator $D_0^{OTT}$ 342 decorrelates an L channel and an R channel corresponding to the $OTT_0$ module, the decorrelator $D_0^{TTT}$ 344 decorrelates an L channel, an R channel, and a C channel, corresponding to the $TTT_0$ module, the decorrelator $D_2^{OTT}$ 346 decorrelates an FR channel and a BR channel corresponding to the $OTT_2$ module, and the decorrelator $D_3^{OTT}$ 348 decorrelates an FL channel and a BL channel, corresponding to the $OTT_3$ module.

A mix-matrix application unit 350 may further apply the matrix M2 individually to the signals output from the decorrelation unit 340 and the direct signal output from the pre-matrix application unit 335.

Here, depending on the embodiment, the mix-matrix application unit 350 may adjust the number of levels to be decoded, e.g., in response to the control signal output from the decoding level control unit 329, so that decoding can be performed through the aforementioned scalable up-mixing.

A TES application unit 335 may apply TES to the signal output from the mix-matrix application unit 350.

A QMF hybrid synthesis unit 360 is a QMF hybrid synthesis filterbank and may transform the signal to the time domain.

A TP application unit 365 applies TP to the signal output from the QMF hybrid synthesis unit 360.

Here, the TES application unit 335 and the TP application unit 365 are to improve the sound quality of a signal in which a temporal structure is important, such as in an applause signal. The TES application unit 335 and the TP application unit 365 may be selectively used and are not necessarily required.

A mixing unit 370 mixes the direct signal and the decorrelated signals.

Again, though this embodiment is implemented with a 5.1-channel signal, as illustrated in FIG. 3, embodiments are not limited thereto. Embodiments of to the present invention can be applied to all multi-channels in which an input down-mixed signal, e.g., as down-mixed in an encoding terminal, is initially up-mixed to an L channel and an R channel in a first stage/level of decoding.

FIG. 4 illustrates a 5-1-5 tree structure, according to an embodiment of the present invention, for decoding up-mixing an input down-mixed signal into multiple channels. By using the 1-to-2 (OTT) modules and a 2-to-3 (TTT) module, FIG. 4 conceptually illustrates an order in which a signal is decoded and up-mixed, according to an embodiment of the present invention.

The $OTT_0$ module 400 receives an input of a down-mixed mono signal, e.g., as down-mixed in an encoder terminal, and decodes and up-mixes the signal to an L signal and an R signal. Here, this first up-mixing of the L and R channel signals is substantially different from the aforementioned 5-1-5 tree structures of FIGS. 1A and 1B, where the first stage OTT module output cannot be used to properly reproduce the L and R channel signals, but rather additional stages are necessary to further up-mix the output of such a first stage OTT module.

Thus, after the $OTT_0$ module, the $TTT_0$ module 410 receives inputs of the L signal and the R signal, output from the $OTT_0$ module 400, and decodes and up-mixes the signal to an L signal, an R signal, and a C signal.

Thereafter, a $OTT_1$ module 420 may receive an input of the C signal, output from the $TTT_0$ module 410, and decode and up-mix the C signal to a C signal and an LFE signal.

A $OTT_3$ module 430 may receive an input of the L signal, output from the $TTT_0$ module 410, and decode and up-mix the L signal to an FL signal and a BL signal.

A $OTT_2$ module 440 may receive an input of the R signal output from the $TTT_0$ module 410, and decode and up-mix the R signal to an FR signal and a BR signal.

Figure 5:
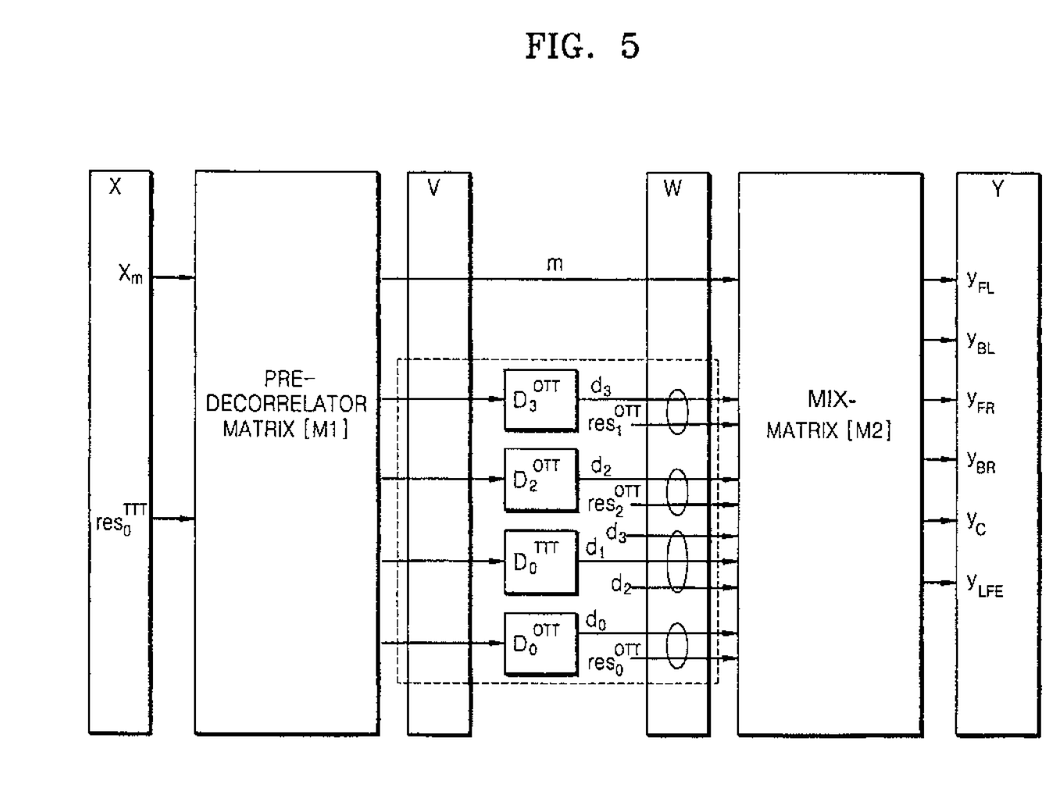
FIG. 5 illustrates a mathematical relationship between an input signal and an output signal in a decoding of multiple channels, according to an embodiment of the present invention.

FIG. 5 illustrating a mathematical relationship between an input signal and an output signal, according to an embodiment of the present invention.

Using a CLD and ICC, a pre-decorrelator matrix M1 receives an input of a down-mixed mono signal (Xm), e.g., down-mixed by an encoder terminal, and output signals to be input to decorrelators $D_0^{OTT}$, $D_0^{TTT}$, $D_2^{OTT}$, and $D_3^{OTT}$.

The decorrelators $D_0^{OTT}$, $D_0^{TTT}$, $D_2^{OTT}$, and $D_3^{OTT}$ decorrelate signals calculated in the matrix M1.

Using a CLD and ICC, a mix-matrix M2 mixes the direct signal (m) and the decorrelated signals, d0, d1, d2, and d3, and up-mixes the signal. Here, the mix-matrix M2 receives inputs of the direct signal (m) and the decorrelated d0, d1, d2, and d3, and outputs an FL signal, a BL signal, an FR signal, a BR signal, a C signal, and an LFE signal.

Figure 6:
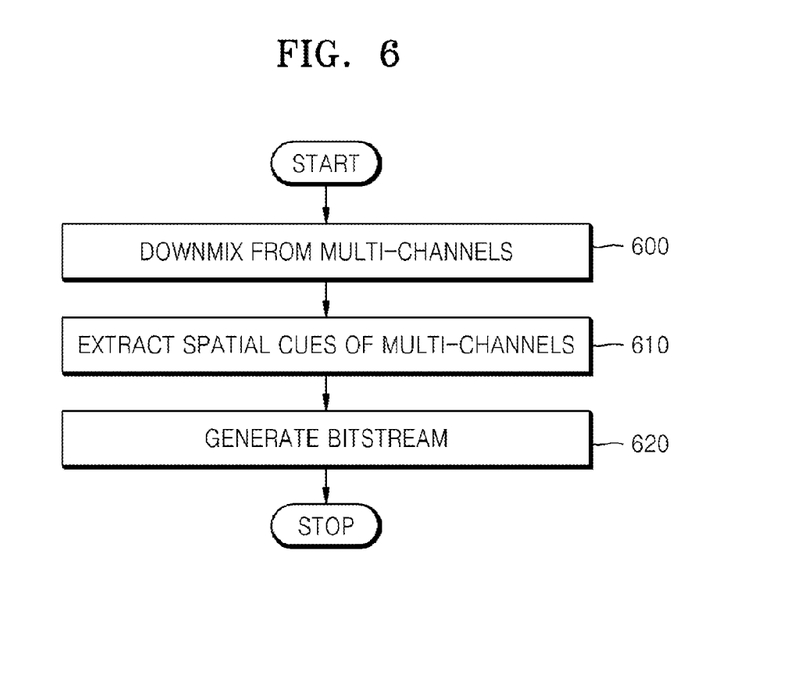
FIG. 6 illustrates a method of encoding multiple channels, according to an embodiment of the present invention.

FIG. 6 illustrates a method of encoding multiple channels, according to an embodiment of the present invention.

First, the multiple channels are down-mixed, in operation 600. For example, the multiple channels may be include an FL channel, a surround L channel, an FR channel, a surround R channel, a C channel and a woofer channel.

In the down-mixing, in operation 600, the L channel and the R channel are down-mixed lastly. For example, in a 5.1 channel system, the FL, surround L, FR, surround R, C and woofer channels may initially be down-mixed to L, R, and C channels previous levels, and the down-mixed 3 channels may then be down-mixed to an L channel and an R channel at a last stage/level.

During the down-mixing of the multiple channels, spatial cues of the corresponding down-mixing of the multiple channels may be respectively extracted, in operation 610. For example, spatial cues extracted for a 5.1 channel system may include information to be used in respectively up-mixing each of the L and R channels, then each of the L, R, and C channels, and then each of the FL and BL channels, each of the FR and BR channels, and each of the C and woofer channels.

A bitstream including the down-mixed signal and the spatial cues may then be generated, in operation 620.

Figure 7:
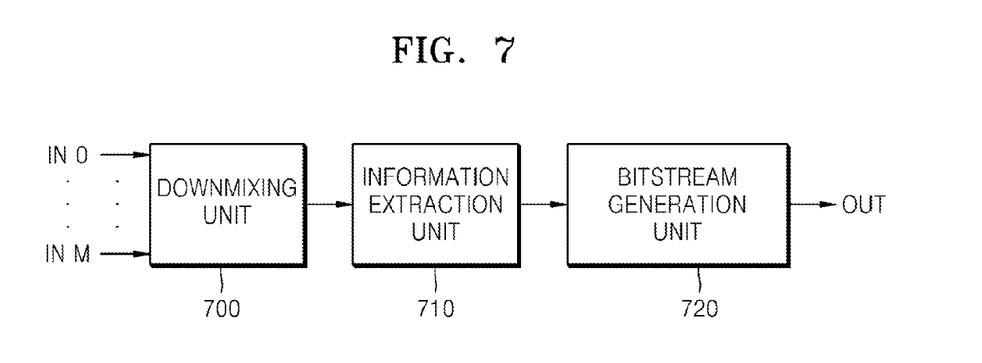
FIG. 7 illustrates a system for encoding multiple channels, according to an embodiment of the present invention.

FIG. 7 illustrates a system for encoding multiple channels, according to an embodiment of the present invention. The system may include a down-mixing unit 700, an information extracting unit 710, and a bitstream generation unit 720.

The down-mixing unit 700 may, thus, down-mix the multiple channels corresponding to input terminals IN 0 through IN M. For example, in a 5.1 channel system, the multiple channels may include FL, surround L, FR, surround R, C and woofer channels.

Here, the down-mixing unit 700 down-mixes the L channel and the R channel lastly. For example, in such a 5.1 channel system, the FL, surround L, FR, surround R, C and woofer channels are down-mixed to L, R, and C channels, and then the down-mixed 3 channels are further down-mixed to the L channel and the R channel.

The information extracting unit 710 may extract respective spatial cues during the staged down-mixing in the down-mixing unit 700. For example, the spatial cues extracted from such a 5.1 channel system may include information to be used in respective staged up-mixing with respect to each of L and R channels, L, R, and C channels, FL and BL channels, FR and BR channels, and C and woofer channels.

The bitstream generation unit 720 may thereafter generate a bitstream including the signal down-mixed in the down-mixing unit 700 and the spatial cues extracted in the information extracting unit 710, and output the bitstream through an output terminal OUT.

According to an embodiment of the present invention, an L channel and an R channel may be down-mixed and encoded lastly, and the same L channel and the R channel may be decoded and up-mixed with the first stage of up-mixing the down-mixed input signal.

In this way, even in scalable channel decoding, appropriate L and R channels can be selectively initially output so that sound quality is not deteriorated and high quality sound can be output, even in a low scaled level of decoding, e.g., even when only a single up-mixing OTT stage is implemented.

In addition, power consumption can also be reduced for easy implementation in mobile applications requiring high quality for stereo sound.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for generating a stereo signal from a mono down-mixed signal, the apparatus comprising:
at least one processing device configured to:
calculate a first spatial parameter for up-mixing the mono down-mixed signal to the stereo signal, based on a second spatial parameter for up-mixing the mono down-mixed signal to a multi-channel signal other than the stereo signal;
generate a first matrix for generating a direct signal and an input signal of a decorrelator;
generate a second matrix, by using the calculated first spatial parameter;
generate the direct signal and the input signal of the decorrelator, based on the first matrix and the mono down-mixed signal;
decorrelate the input signal of the decorrelator; and
mix the direct signal and the decorrelated signal, based on the second matrix, to generate the stereo signal.

2. The apparatus of claim 1, wherein the stereo channel is determined based on a channel configuration of a decoder.

3. The apparatus of claim 1, wherein the second matrix is obtained based on a calculated channel level difference (CLD) and a calculated inter-channel correlation (ICC).

4. An apparatus for generating a stereo signal from a mono down-mixed signal, the apparatus comprising:
at least one processing device configured to:
calculate a first spatial parameter for up-mixing the mono down-mixed signal to the stereo signal, based on a second spatial parameter for up-mixing the mono down-mixed signal to a multi-channel signal other than the stereo signal;
generate, using a first operation set and the mono down-mixed signal, an input signal of a decorrelator and a direct signal to be input to a second operation set, the second operation set being determined by the calculated first spatial parameter;
decorrelate the input signal of the decorrelator; and
mix the direct signal and the decorrelated signal, based on the second operation set, to generate the stereo signal.

5. The apparatus of claim 4, wherein the stereo signal is determined based on a channel configuration of a decoder.

6. The apparatus of claim 4, wherein the second operation set is obtained based on a calculated channel level difference (CLD) and a calculated inter-channel correlation (ICC).

* * * * *